(12) United States Patent
Zhou et al.

(10) Patent No.: US 8,231,994 B2
(45) Date of Patent: Jul. 31, 2012

(54) BATTERY COVER MECHANISM

(75) Inventors: Ji Zhou, Shenzhen (CN); Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 488 days.

(21) Appl. No.: 12/497,751

(22) Filed: Jul. 6, 2009

(65) Prior Publication Data
US 2010/0028763 A1 Feb. 4, 2010

(30) Foreign Application Priority Data

Jul. 30, 2008 (CN) .......................... 2008 1 0303196

(51) Int. Cl.
*H01M 2/10* (2006.01)
(52) U.S. Cl. .................... 429/97; 361/679.01; 361/747; 455/575.1
(58) Field of Classification Search ............ 429/96–100; 361/747, 679.01, 679.02, 679.55–679.58; 379/433.08; 455/575.1, 575.4, 575.8
See application file for complete search history.

(56) References Cited

U.S. PATENT DOCUMENTS

| | | | | |
|---|---|---|---|---|
| 5,607,792 A | * | 3/1997 | Garcia et al. .................... | 429/97 |
| 2006/0139856 A1 | * | 6/2006 | Liu et al. ....................... | 361/600 |
| 2006/0175840 A1 | * | 8/2006 | Wang et al. .................. | 292/228 |
| 2007/0111086 A1 | * | 5/2007 | Li et al. .......................... | 429/97 |

* cited by examiner

*Primary Examiner* — Basia Ridley
*Assistant Examiner* — Jonathan G Leong
(74) *Attorney, Agent, or Firm* — Altis Law Group, Inc.

(57) ABSTRACT

A battery cover mechanism used in a portable electronic device includes a housing, a battery cover and an operating member. The housing has a first surface, a receiving groove defined therefrom for receiving a battery and an elastic arm disposed thereon adjacent to the receiving groove. The battery cover is detachably mounted on the housing to cover the receiving groove and defines a notch therethrough. The operating assembly comprises a pedestal and an operating member. The pedestal is fixedly mounted on the battery cover and releasably resisted by the elastic arm. The operating member is rotatably assembled with the pedestal and accommodated within the corresponding notch of the battery cover so as to make the elastic arm release the pedestal to detach the battery cover from the housing.

10 Claims, 8 Drawing Sheets

BATTERY COVER MECHANISM

CROSS-REFERENCE TO RELATED APPLICATIONS

This application is related to co-pending U.S. patent application 12/497,748, both entitled "BATTERY COVER MECHANISM". Such application has the same assignee as the present application. The above-identified application is incorporated herein by reference.

BACKGROUND

1. Technical Field

The exemplary disclosure generally relates to battery cover mechanisms, and particularly, to a battery cover mechanism used in a portable electronic device.

2. Description of Related Art

Batteries are widely used in portable electronic devices, such as personal digital assistants (PDAs), mobile phones, and so on. Conventional batteries are detachably received in the electronic device, and battery cover mechanisms are designed to connect with housings of the electronic devices to package the batteries, thus the batteries and the inner circuits of the portable electronic devices are well protected.

A conventional battery cover mechanism generally includes a cover and a housing. The cover tightly engages with the housing to be secured thereon. However, due to the tight engagement of the cover and the housing in many conventional designs, a significant amount of contact and friction exist between the cover and the housing. As a result, the user may need to apply a significant amount of force to assemble/disassemble the cover to/from the housing. Further, the cover and the housing may be distorted or even damaged by the contact or friction between each other in the assembly/disassembly operations.

Therefore, there is room for improvement within the art.

BRIEF DESCRIPTION OF THE DRAWINGS

Many aspects of the battery cover mechanism can be better understood with reference to the following drawings. These drawings are not necessarily drawn to scale, the emphasis instead being placed upon clearly illustrating the principles of the present battery cover mechanism. Moreover, in the drawings like reference numerals designate corresponding sections throughout the several views.

DETAILED DESCRIPTION

Figure 1:
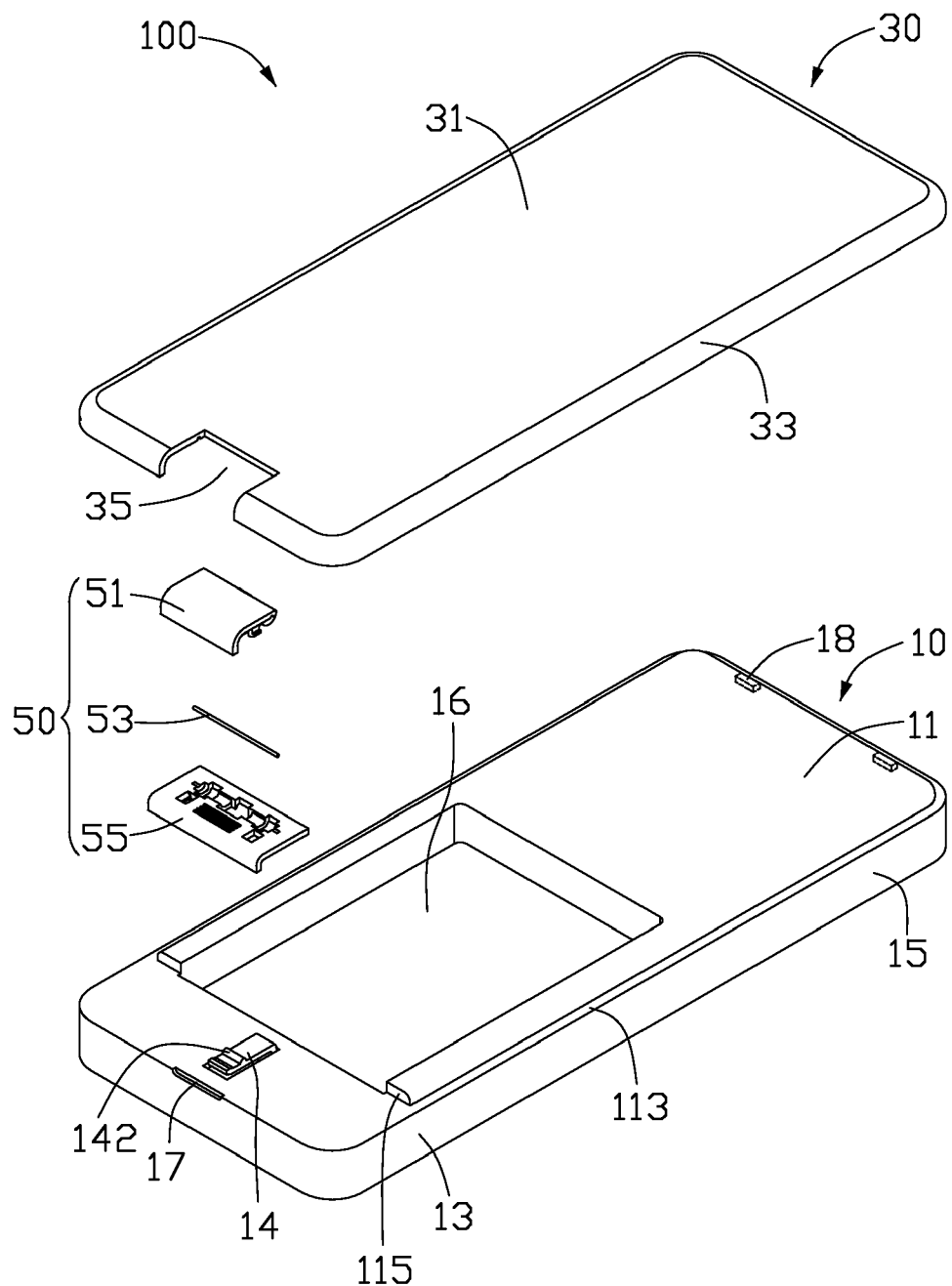
FIG. 1 shows an exploded, perspective view of a battery cover mechanism, in accordance with an exemplary embodiment.
Figure 2:
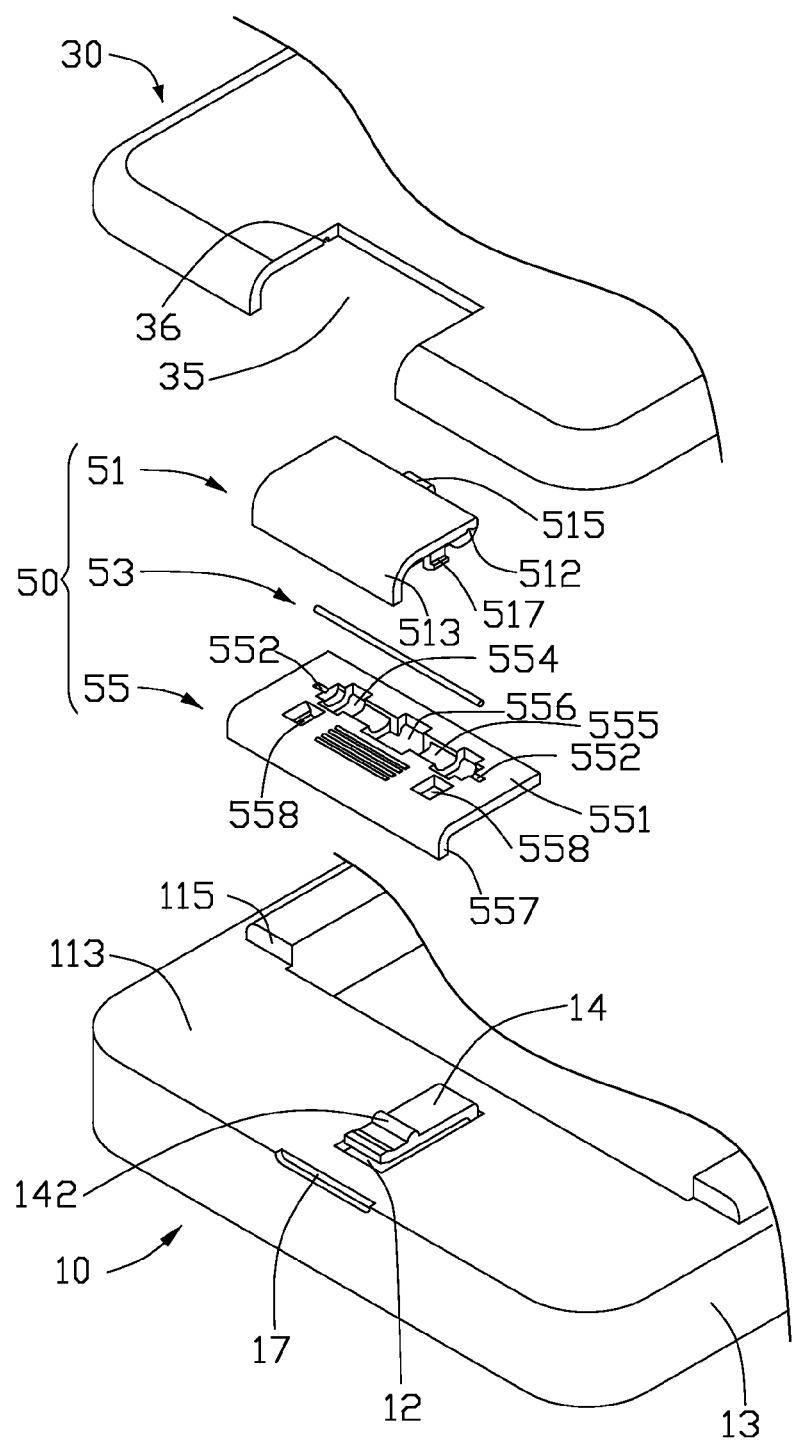
FIG. 2 shows a partial enlarged view of the battery cover mechanism shown in FIG. 1.

Referring to FIG. 1 and FIG. 2, an exemplary battery cover mechanism 100 for portable electronic devices, such as mobile phones, digital cameras and etc., is shown. The battery cover mechanism 100 includes a housing 10, a battery cover 30, and an operating assembly 50. The operating assembly 50 is mounted on the battery cover 30 to detachably assemble the battery cover 30 to the housing 10.

The housing 10 may be a part of a portable electronic device. The housing 10 includes a first surface 11, a first end 13, an elastic arm 14 and an opposite second end 15. The peripheral edge of the first surface 11 defines a recessed assembling surface 113 therefrom, and thus forms a substantially board shaped protrusion 115 surrounded by the recessed assembling surface 113. The protrusion 15 has two spaced latching slots 18 recessed therefrom adjacent to the second end 15. The housing 10 further defines a receiving groove 16 recessed therefrom adjacent to the first end 13 for receiving a battery (not shown). The recessed assembling surface 113 of the first end 13 defines a through hole 12 longitudinally in the substantially middle portion adjacent to the receiving groove 16. The elastic arm 14 is disposed on the housing 10 adjacent to the receiving groove 16, so as to detachably latch with the operating assembly 50. In the exemplary embodiment, the elastic arm 14 is substantially bar shaped protruding from the inner wall of the through hole 12 and partially exposed out of the through hole 12 toward the assembling surface 113. The elastic arm 14 includes a bar shaped resisting portion 142 protruding therefrom. The junction of the cross section of the first end 13 and the assembling surface 113 defines a bar shaped groove 17 recessed in the middle portion thereof communicating with the assembling surface 113.

Figure 3:
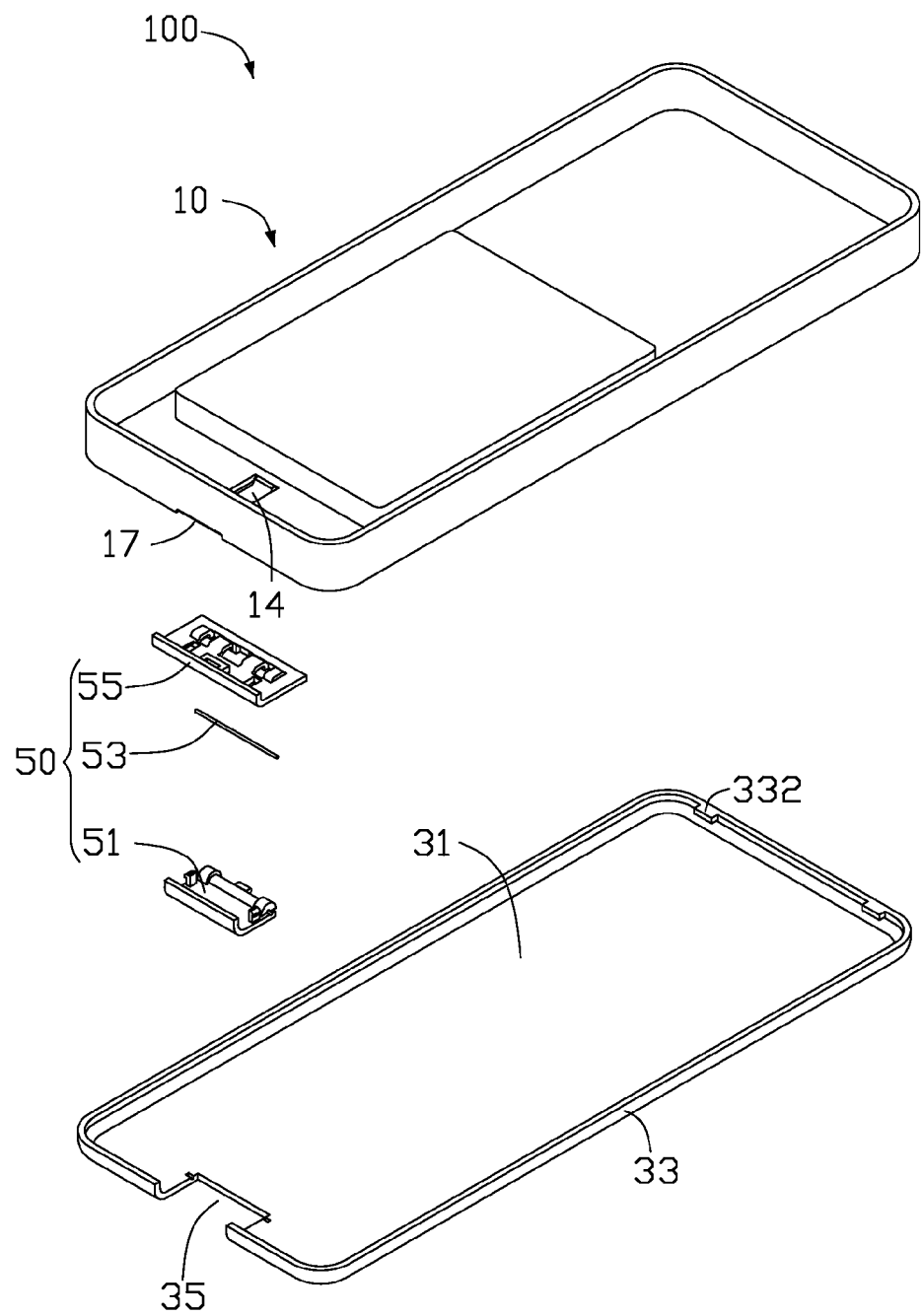
FIG. 3 shows an exploded, perspective view of the battery cover mechanism shown in FIG. 1, but shown in another view angle.
Figure 4:
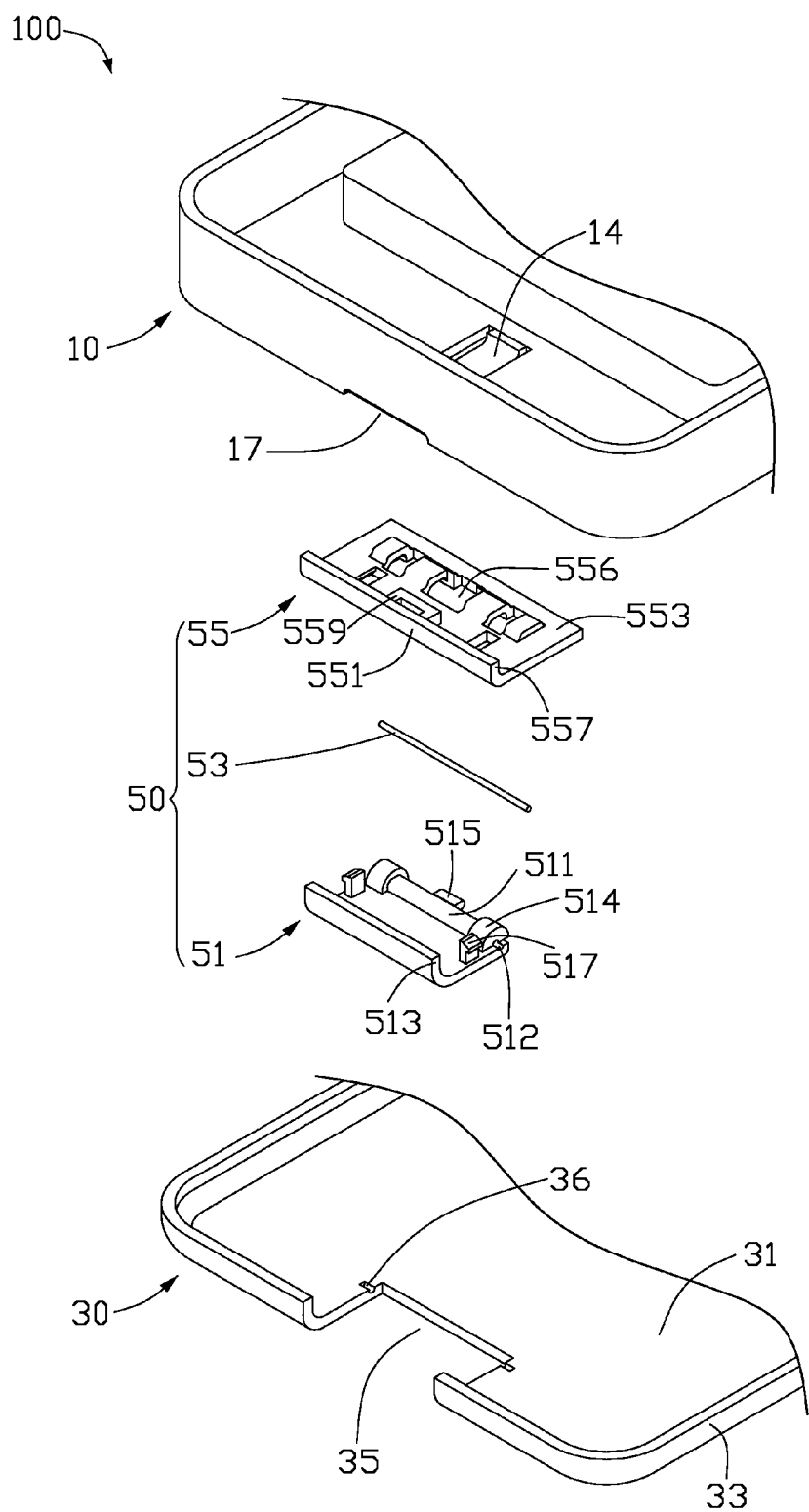
FIG. 4 shows a partial enlarged view of the battery cover mechanism shown in FIG. 3.
Figure 5:
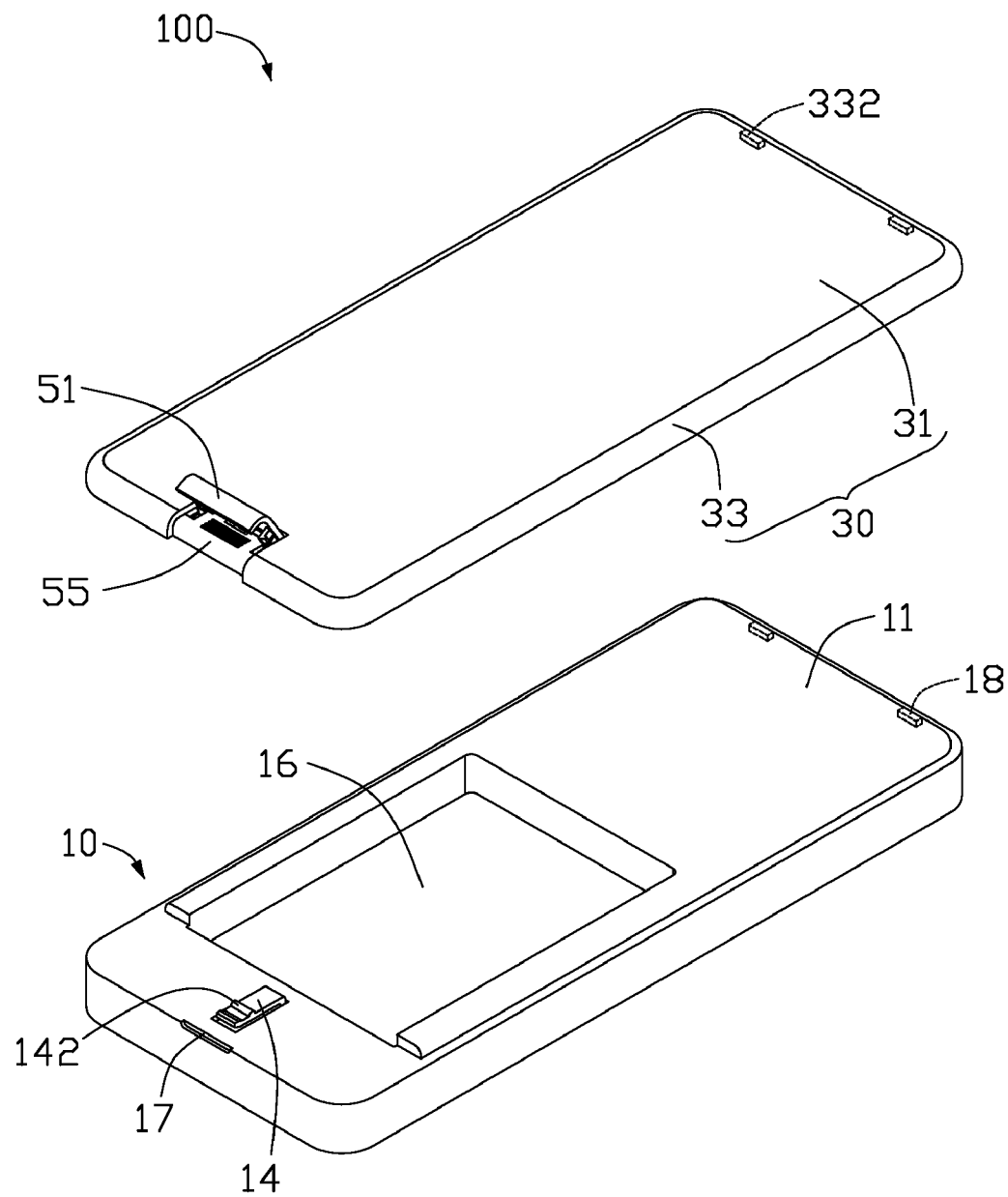
FIG. 5 shows a perspective view of the battery cover mechanism, wherein, the battery cover is detached from the housing.
Figure 6:
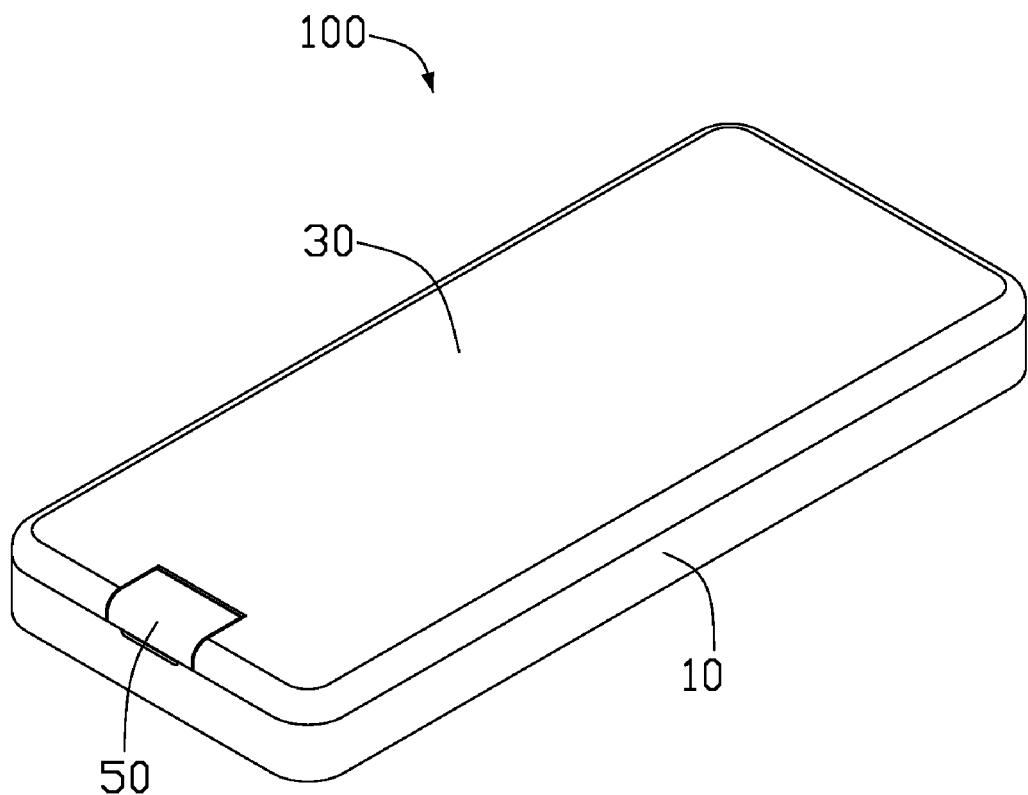
FIG. 6 shows a perspective view of the battery cover mechanism, wherein, the battery cover is mounted on the housing.

Also referring to the FIGS. 3 and 4, the battery cover 30 is detachably mounted on the first surface 11 of the housing 10 to cover the receiving groove 16. The battery cover 30 includes a top wall 31 and a peripheral wall 33 perpendicularly extending from the peripheral edge of the top wall 31. The battery cover 30 has a notch 35 defined at one end thereof corresponding to the elastic arm 14 and the groove 17 of the housing 10, so as to assembled the operating assembly 50. The inner surface of the top wall 31 of the battery cover 30 has two semi-cylindrical hinged slots 36 recessed therefrom opposite to each other. The opposite end of the battery cover 30 has two spaced latches 332 disposed thereon corresponding to the two latching slots 18 respectively.

The operating assembly 50 is mounted on the battery cover 30 and includes an operating member 51, a cylindrical shaft 53 and a pedestal 55. The operating member 51 is a curved plate and is rotatably assembled with the battery cover 30 and accommodated within the notch 35 of the battery cover 30. The operating member 51 includes a hinged portion 511 disposed at one end thereof, an arcuated assembling portion 513 opposite to the hinged portion 511 and two latching portions 517. The hinged portion 511 is substantially semi-cylindrical shaped and has a hinged hole 512 defined axially therethrough. The hinged portion 511 includes two hinged ends 514 and a releasing portion 515 disposed at the middle portion of the hinged portion 511. The releasing portion 515 protrudes outwardly from the middle portion of the hinged portion 511 and is opposite to the assembling portion 513.

The two latching portions 517 are disposed at the two sides of the operating member 51 respectively and opposite to each other.

The pedestal 55 is substantially curved plate shape fixedly mounted on the inner wall of the battery cover 30 corresponding to the notch 35 thereof. The pedestal 55 and the notch 35 of the battery cover 30 cooperatively form an assembling space (not labeled) to assemble the operating member 51 therein. The pedestal 55 includes an assembling surface 551, an opposite bottom surface 553 and an arcuated end 557. The assembling surface 551 defines a substantially semi-cylindrical recessed assembling slot 555 therefrom corresponding to the hinged portion 511 of the operating member 51. The assembling slot 555 defines two apertures 554 at two ends thereof and a middle aperture 556 in a middle portion thereof corresponding to the two hinged ends 514 and the releasing portion 515 of the hinged portion 511 respectively. The two distal ends of the assembling slot 555 both define a hinged slot 552 therefrom axially corresponding to the two hinged slots 36 of the battery cover 30 respectively. The assembling surface 551 defines two opposite latching holes 558 therethrough adjacent to the arcuated end 557 corresponding to the two latching portions 517 of the operating member 51. The bottom surface 553 of the pedestal 55 includes a resisting portion 559 protruding from the middle portion thereof adjacent to the arcuated end 557 corresponding to the elastic arm 14 of the housing.

In assembly, the cylindrical shaft 53 penetrates through the hinged hole 512 of the operating member 51. The operating member 51 is mounted on the pedestal 55, the hinged portion 511 of the operating member 51 is assembled within the assembling slot 555 of the pedestal 55, and the two ends of the cylindrical shaft 53 are rotatably assembled in the two hinged slots 552 of the pedestal 55 respectively. The two hinged ends 514 and the releasing portion 515 of the hinged portion 511 are placed and accommodated within the corresponding two apertures 554 and the middle aperture 556 of the pedestal 55 respectively. The two latching portions 517 penetrate into and latch with the two latching holes 558 of the pedestal 55 respectively. The pedestal 55 is fixedly mounted on (such as welding technology) the inner surface of the battery cover 30 and is positioned under the notch 35 of the battery cover 30. The two hinged slots 36 of the battery cover 30 are assembled with the corresponding two hinged slots 552 of the pedestal 55 respectively to rotatably assemble the shaft 53 there between. The operating member 51 is rotatably accommodated within the notch 35 of the battery cover 30 and can be rotated relative to the pedestal 55 and the battery cover 30. When the operating member 51 is closed and accommodated within the notch 35 of the battery cover 30, the releasing portion 515 of the operating member 51 is accommodated within the middle aperture 556 of the pedestal 55, and the two latching portions 517 latch with the two latching holes 558 of the pedestal 55 respectively.

Also referring to FIG. 5, FIG. 6, FIG. 7 and FIG. 8, when the battery cover 30 needs to be assembled to the housing 10, the operating member 51 is closed and accommodated within the notch 35 of the battery cover 30. The two latches 332 are inserted into and latch with the two latching slots 18 of the housing 10 respectively. The battery cover 30 is pushed downwardly to let the top wall 31 of the battery cover 30 tightly resist on the first surface 11 of the housing. The peripheral wall 33 of the battery cover 30 surrounds the protrusion 115 and tightly contacts with the recessed assembling surface 113 of the housing 10. The elastic arm 14 tightly resists on the resisting portion 559 of the pedestal 55. The assembling portion 513 is located on the bar shaped groove 17 so as to be opened conveniently.

Figure 7:
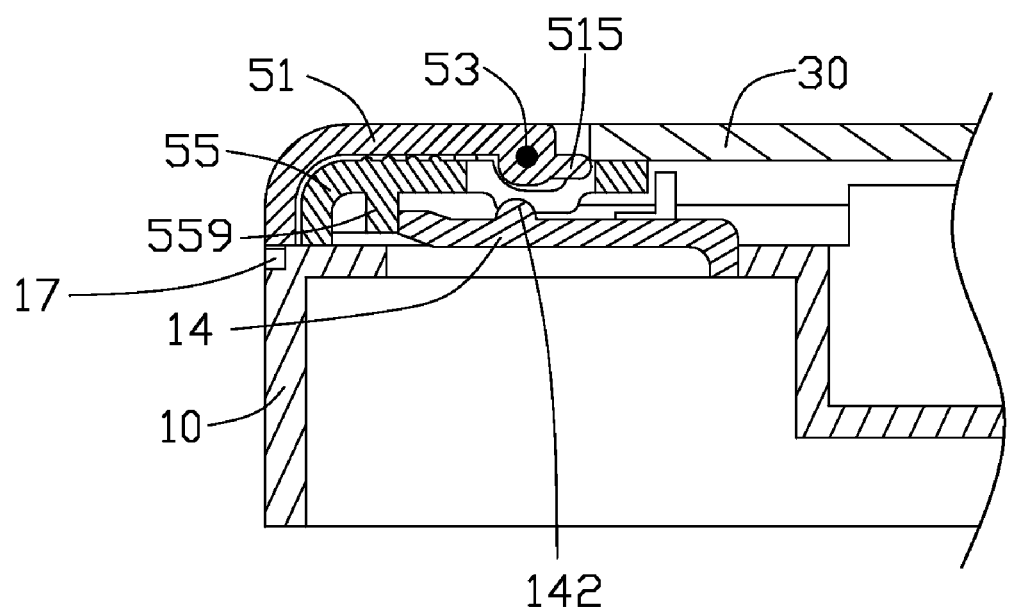
FIG. 7 shows an assembled, partially cut-away view of the battery cover mechanism shown in FIG. 6, wherein the battery cover mechanism is in a closed mode.
Figure 8:
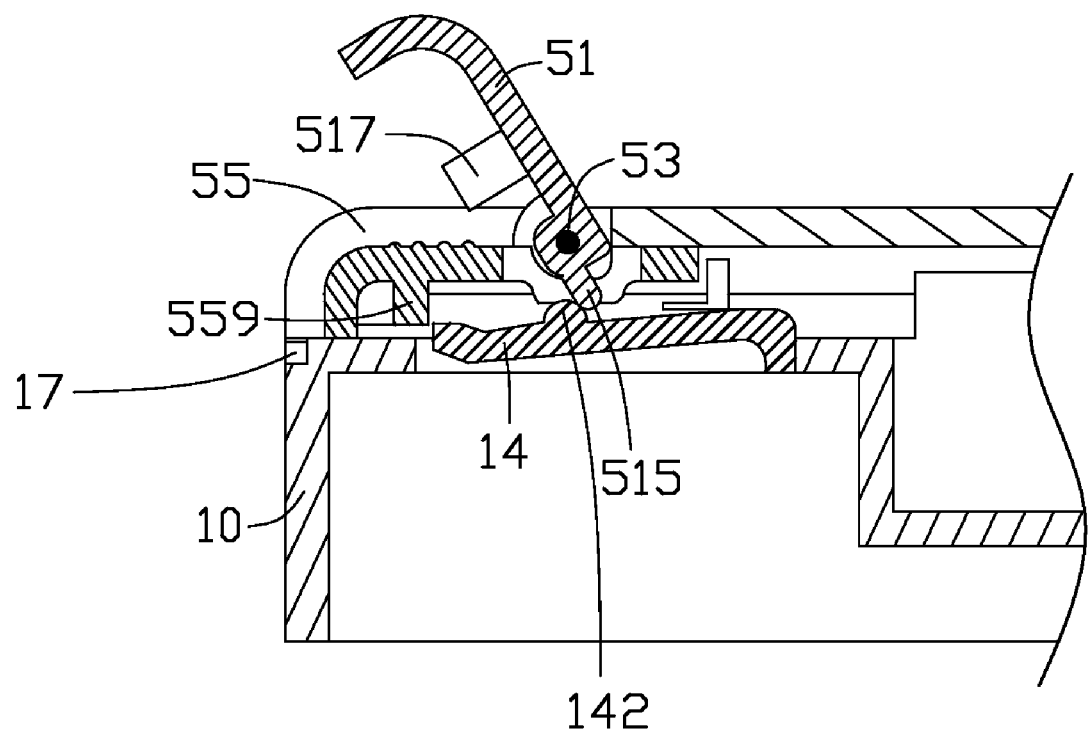
FIG. 8 shows an assembled, partially cut-away view of the battery cover mechanism, wherein the battery cover mechanism is in an opened mode.

Referring to FIGS. 7 and 8, when the battery cover 30 needs to be detached from the housing 10, the operating member 51 is rotated by pulling the groove 17 of the housing 10 to release from the pedestal 55. During the rotating process, the releasing portion 515 of the operating member 51 is rotated toward and presses on the resisting portion 142 of the elastic arm 14 of the housing 10 to make the elastic arm 14 depart from the resisting portion 559 of the pedestal 55. Then, the battery cover 30 is pushed toward the second end 15 of the housing to let two latches 332 of the battery cover 30 detach from the two latching slots 18 of the housing 10 respectively, such that the battery cover 30 is detached from the housing 10.

It is to be understood that the number of the latching portions 517 of the operating member 51 is not just limited to two, the number also can be increased or decreased by the needs. For example, the number of the latching portions 517 can be one or more than two. Correspondingly, the number of the latching holes 558 of the pedestal 55 is not just limited to the two, and the number also can be increased or decreased by the needs.

It is to be understood that the number of the latches 332 of the battery cover 30 is not just limited to two, the number also can be increased or decreased by the needs. Correspondingly, the number of the latching slots 18 of the housing 10 is not just limited to the two, and the number also can be increased or decreased by the needs accordance with the number of the latches 332 of the battery cover 30.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover mechanism used in a portable electronic device, comprising:
   a housing having a first surface, and an elastic arm disposed on the first surface;
   a battery cover detachably mounted on the housing and defining a notch therethrough; and
   an operating assembly being a curved plate and mounted on the battery cover to assemble the battery cover to the housing or detach the battery cover from the housing, the operating assembly comprising a pedestal and an operating member;
       the operating member including a hinged portion disposed at one end thereof, the hinged portion including a releasing portion protruding outwardly therefrom, the releasing portion rotatable with the operating member to releasably resist on the elastic arm; and
       the pedestal fixedly mounted on the battery cover and releasably resisted by the elastic arm and comprising an assembling surface, an opposite bottom surface and an arcuated end; the bottom surface of the pedestal including a resisting portion protruding therefrom adjacent to the arcuated end corresponding to the elastic arm of the housing, the elastic arm releasably resisting on the resisting portion;
   wherein, the operating member is rotatably assembled with the pedestal and accommodated within the corresponding notch of the battery cover so as to make the elastic arm release the pedestal to detach the battery cover from the housing.

2. The battery cover mechanism as claimed in claim 1, wherein the elastic arm includes a bar shaped resisting portion protruding there from corresponding to the releasing portion of the operating member.

3. The battery cover mechanism as claimed in claim 1, wherein the operating member further includes an arcuated assembling portion opposite to the hinged portion and at least one latching portion protruding from the inner surface of the operating member; the assembling surface of the pedestal defines at least one latching hole corresponding to the at least one latching portion so as to latch with each other.

4. The battery cover mechanism as claimed in claim 3, wherein the hinged portion is substantially semi-cylindrical shaped and has a hinged hole defined therethrough axially; the assembling surface of the pedestal defines a substantially semi-cylindrical recessed assembling slot therefrom corresponding to the hinged portion of the operating member, the operating assembly further includes a cylindrical shaft, the shaft penetrates through the hinged hole of the operating member and rotatably assembled within the assembling slot of the pedestal, the hinged portion is rotatably accommodated within the assembling slot.

5. The battery cover mechanism as claimed in claim 4, wherein the assembling slot defines a middle aperture in a middle portion thereof corresponding to the releasing portion of the hinged portion, the releasing portion is accommodated within the middle aperture and rotated along with the operating member to release the elastic arm.

6. The battery cover mechanism as claimed in claim 1, wherein the housing further includes a first end and an opposite second end, the first end having the first surface, the first surface of the first end has a through hole defined therethrough, the elastic arm protrudes from an inner wall of the through hole toward the first end and is partially exposed out of the through hole.

7. The battery cover mechanism as claimed in claim 6, wherein the junction of the cross section of the first end and the assembling surface defines a bar shaped groove recessed therefrom corresponding to the operating member communicating with the first surface for detaching the battery cover.

8. The battery cover mechanism as claimed in claim 6, wherein the second end of the housing further includes at least one latching slot recessed therefrom, the battery cover further includes at least one latch disposed thereon opposite to the notch and corresponding to the at least one latching slot for latching the battery cover with the housing.

9. The battery cover mechanism as claimed in claim 1, wherein a peripheral edge of the first surface defines a recessed assembling surface therefrom, and thus forms a board shaped protrusion surrounded by the recessed assembling surface; a receiving groove is recessed in the board-shaped protrusion.

10. A battery cover mechanism comprising:
a housing having a first surface, a recessed assembling surface recessed from the peripheral edge of the first surface and an elastic arm disposed on the recessed assembling surface adjacent one end there of;
a battery cover comprising a top wall, a peripheral wall extending from a peripheral edge of the top wall and a notch defined through one end there of corresponding to the elastic arm; the battery cover is detachably mounted on the first surface of the housing, the peripheral wall resists on the recessed assembling surface tightly; and
an operating assembly mounted on the battery cover to assemble the battery cover to the housing or detach the battery cover from the housing, the operating assembly comprising a pedestal and an operating member, the pedestal is fixedly mounted on the battery cover and releasably resisted by the elastic arm, the operating member is rotatably assembled with the pedestal and accommodated within the corresponding notch of the battery cover so as to make the elastic arm release the pedestal to detach the battery cover from the housing:
the housing defining a rectangular through hole through the recessed assembling surface of one end thereof corresponding to the notch of the battery cover, the elastic arm protruding from an inner wall of the through hole and is partially exposed out of the through hole; the operating member including a hinged portion disposed at one end thereof and a releasing portion protruding outwardly from the hinged portion corresponding to the elastic arm so as to release the elastic arm;
the hinged portion of the operating member defining a hinged hole therethrough axially; the operating assembly further including a shaft penetrating through the operating member to rotatably assemble the operating member to the pedestal;
the operating member further including at least one latching portion protruding from the inner surface thereof; the pedestal defining at least one latching hole corresponding to the at least one latching portion for latching with each other.

* * * * *